Sept. 4, 1962  R. F. PIERCE ETAL  3,052,283
APPARATUS FOR PRODUCING TUBING
Filed April 18, 1956  3 Sheets-Sheet 1
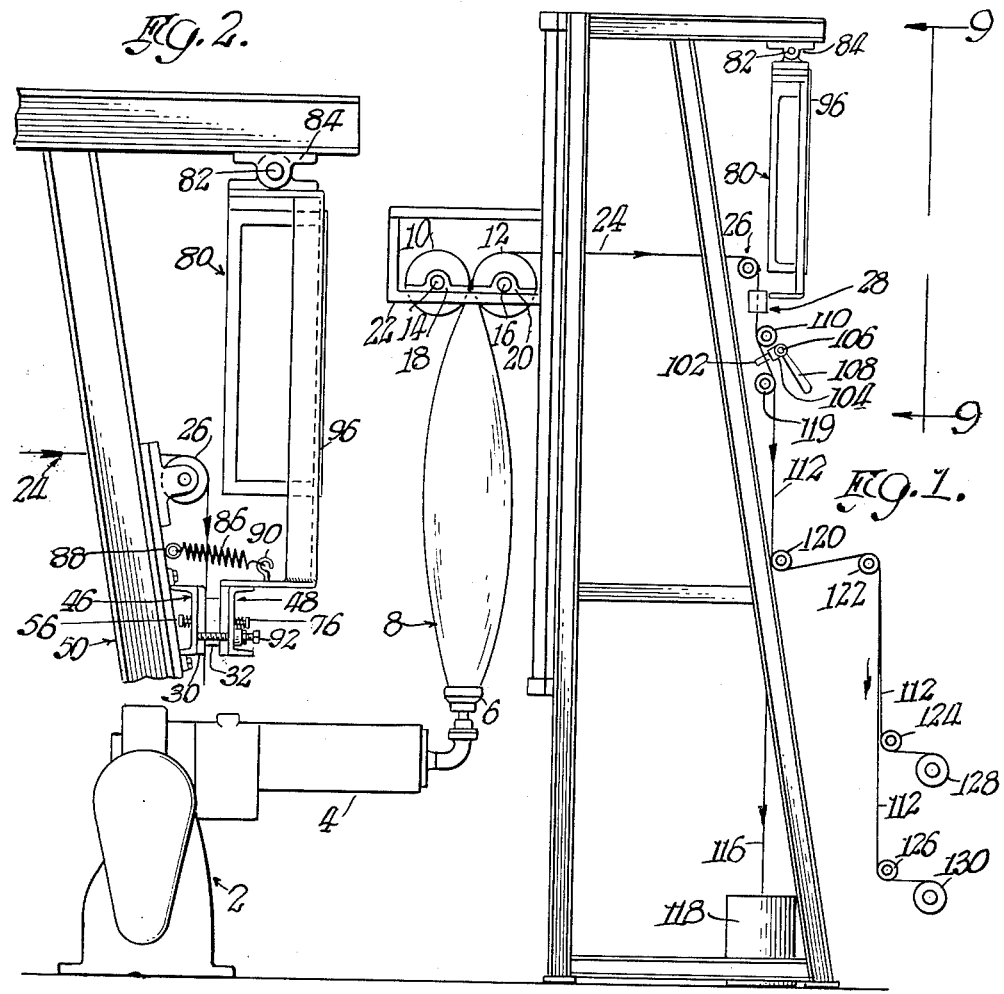
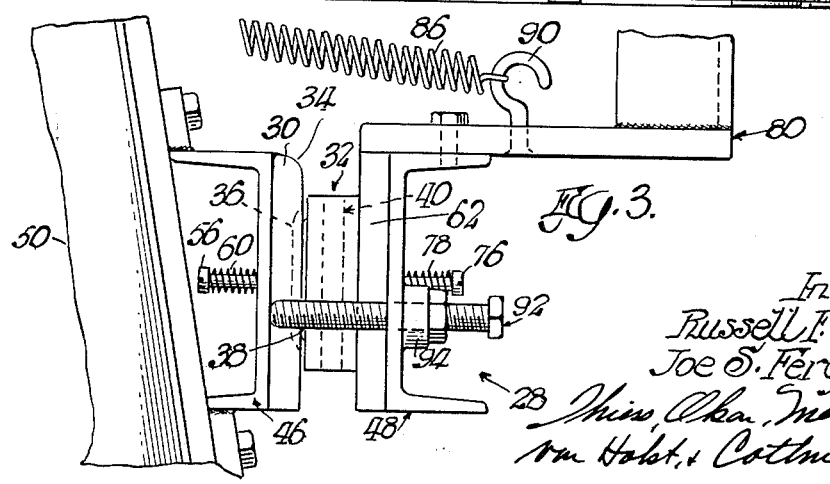

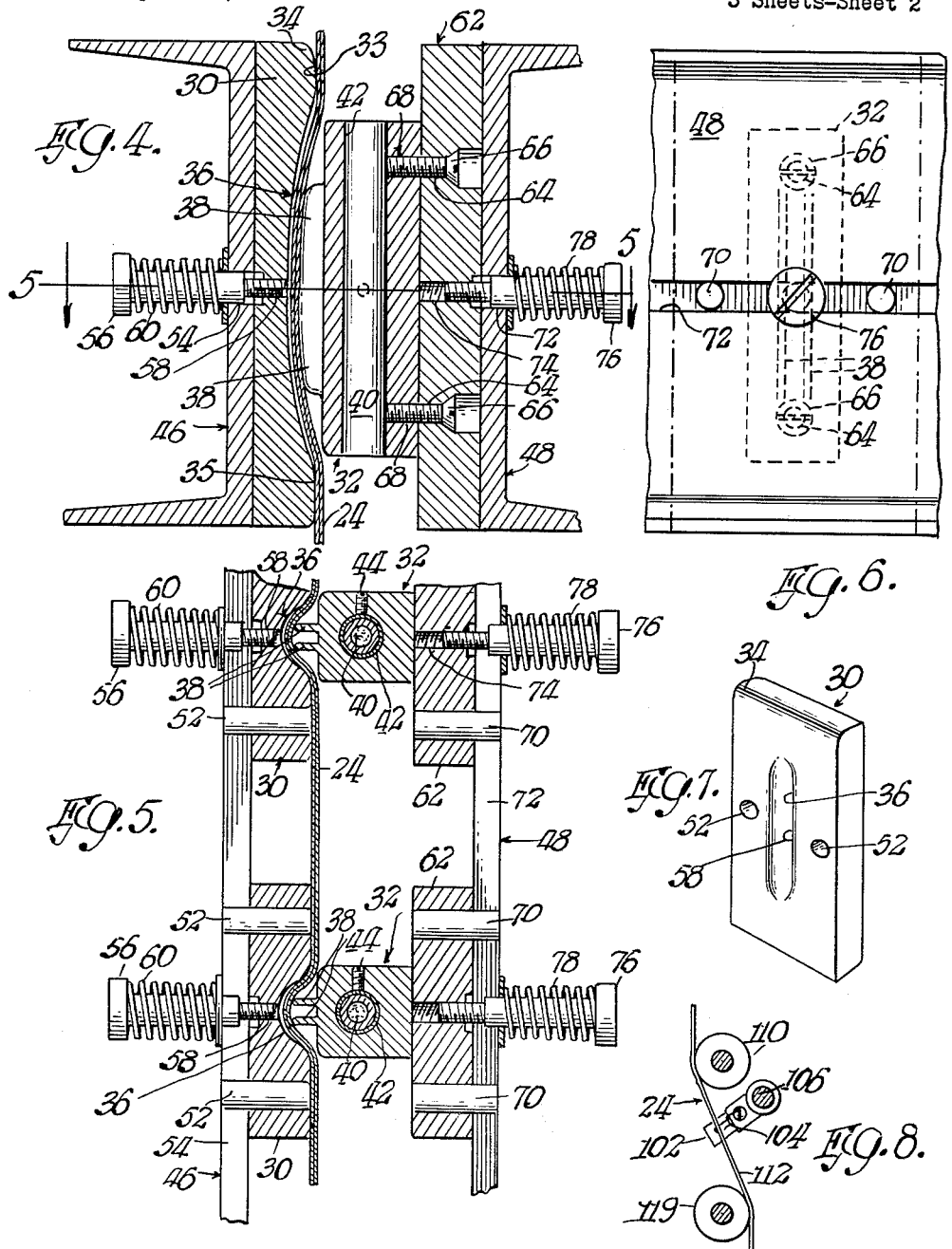

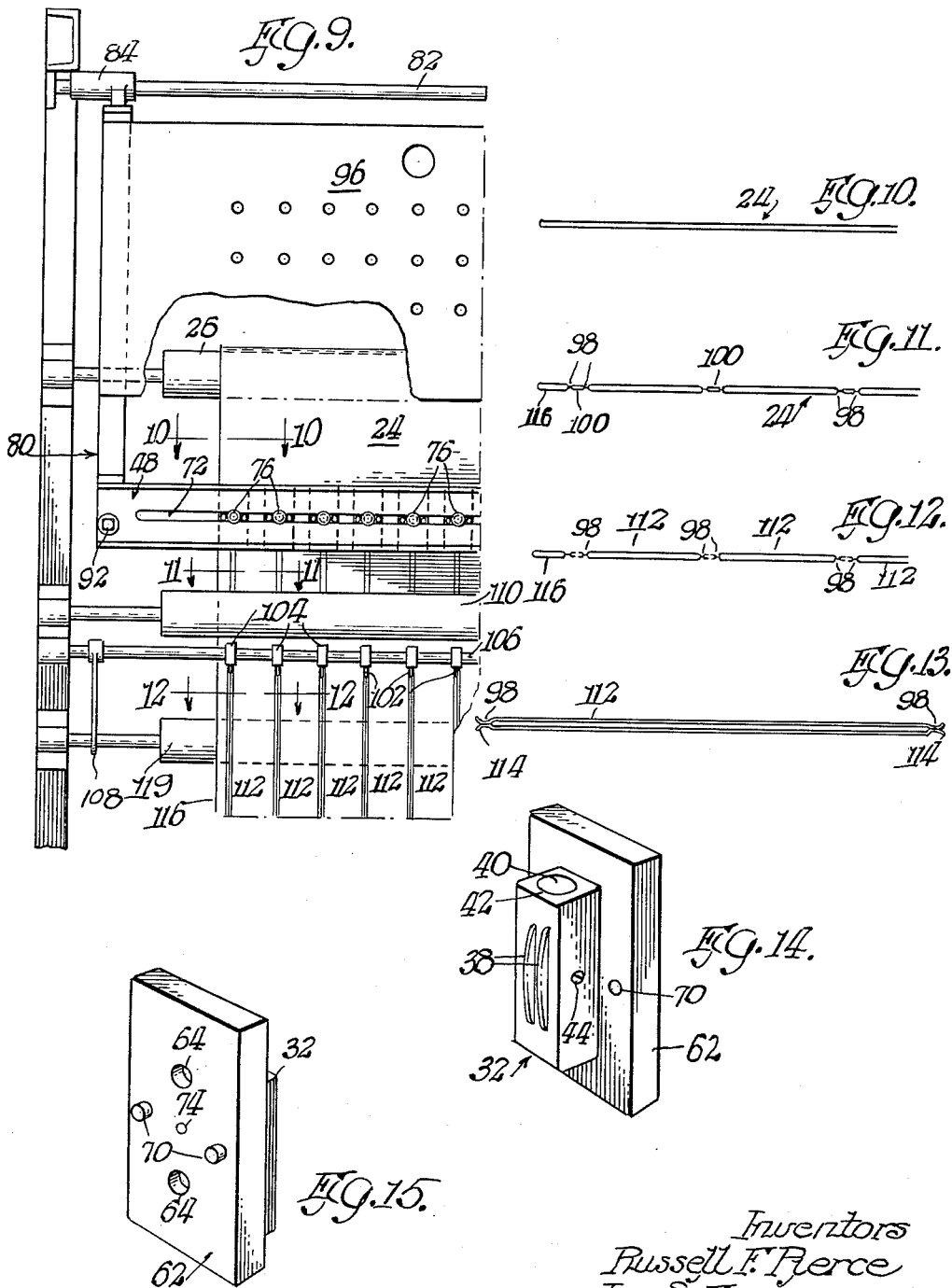

3,052,283
APPARATUS FOR PRODUCING TUBING
Russell F. Pierce and Joe S. Ferguson, Terre Haute, Ind., assignors, by mesne assignments, to Union Carbide Corporation, a corporation of New York
Filed Apr. 18, 1956, Ser. No. 579,034
14 Claims. (Cl. 156—516)

This invention pertains to a method and apparatus for forming tubing from thermoplastic materials.

In the production of flattened, seamless, self-sustaining tubing, a thermoplastic composition was melt extruded through an annular orifice in the form of a seamless tubing; and, as the tubing was being withdrawn from the die and while it was in the plastic formative state, it was inflated to a predetermined diameter. After setting, the tubing was collapsed and wound up in the flattened condition. Preferably the exterior peripheral surface of the tubing was cooled to set the tubing.

The aforementioned process produced tubings of predetermined diameters which when flattened had corresponding flat widths. Each set up of the apparatus for the latter process produced tubings of specific flat width. Inasmuch as tubings of various flat widths were required, it was necessary to change the die and orifices thereof and other conditions when tubing of a flat width other than that for which the apparatus was set up was ordered. Thus, to supply tubings of the different flat widths required by the trade, it was necessary to have a separate apparatus for producing each different size or, in the alternative, to shut down a machine and make the required changes.

It is an object of this invention to provide a continuous method and apparatus for simultaneously forming a plurality of tubings.

It is another object of this invention to provide apparatus for simultaneously forming a plurality of tubing of any desired flat width or widths in an efficient and facile manner.

It is another object of this invention to provide a novel process and apparatus for heat-sealing predetermined portions of two superposed plies of thermoplastic material together.

It is a still further object of this invention to provide a method for forming a plurality of parallel pockets in an integral thermoplastic tubing member.

It is another object of this invention to provide novel tubings having opposed side seams which are durable and of great strength.

The above and other objects will become more apparent from the following description, accompanying drawings and appended claims.

In carrying out one embodiment of this invention, a thermoplastic material is dry extruded from a melt thereof through an annular die orifice to form an inflated seamless tubing. The withdrawal of the tubing from the die is obtained by a pair of squeeze rolls spaced from the point of extrusion. The squeeze rolls also serve to collapse the inflated tubing into the form of a two-ply ribbon. The ribbon is then passed through a heat-sealing station comprising a plurality of spaced, horizontally aligned heat-sealing units and a plurality of oppositely disposed recessed back-up pads over which the ribbon slidably moves. Both the heat-sealing units and the back-up pads are disposed transversely to the path of the moving ribbon and are adapted to assume desired predetermined positions preliminarily to the ribbon passing therebetween. Each of the heat-sealing units has two projecting runner portions of arcuate configuration disposed in planes parallel to the longitudinal axis of the moving ribbon. The latter ribbon slidably engages the arcuate runners which are heated in the normal course of operation. The two runners of each heat-sealing unit form one seam comprising two longitudinal equidistantly spaced heat seals having an unsealed tubing portion disposed therebetween.

The recessed portion of each back-up pad which is oppositely disposed to two sealing runners of a heat-sealing unit in the normal position of assembly is of such a size so as to receive the projecting runners therein. The moving ribbon slidably passes over opposed coplanar flat portions of the back-up pad which define the longitudinal end limits of each pad recess and slidably passes over the sealing runner edges which are positioned in the pad recess but spaced from the surface of the recessed portion, thereby enabling the ribbon to clear the same. The flat portions of the back-up pad support the ribbon portions disposed at either end of the pad recess.

The sealing units are adjustable relative to the back-up pads thereby enabling the sealing runners to be positioned in the opposed back-up pad recesses as desired, thereby effecting a suitable arc of contact with the interposed moving ribbon, as will hereafter be explained in greater detail. The ribbon emerging from the heat-sealing station comprises an integral tubing member having a plurality of longitudinally extending pockets formed therein. Such a pocket-containing tubing product may be utilized to advantage in the packaging industry.

However, when discrete tubings of lesser flat widths are desired to be formed from the integral ribbon member, the integral ribbon is slit simultaneously along the center line of the unsealed portion between each of the aforesaid spaced seals, whereby a plurality of discrete tubings having opposed side heat-sealed seams are effected. The blade members effecting the slitting operation are readily adjustable relative to the path of the moving ribbon to engage the unsealed seam portion disposed between the two heat seals defining each seam. Each tubing is then wound on a separate reel member. The resulting tubings can be employed for a large variety of well-known uses, such as the packaging of various articles.

The heat-sealing assemblies and the slitting means are readily adjustable on aligning means disposed transversely to the path of the moving ribbon. Accordingly, the desired flat width or widths of the discrete tubings formed may be readily had by appropriately positioning the pad and heat-sealing unit sealing assemblies and the slitting means at proper intervals on their respective aligning means.

In a preferred embodiment of this invention, the collapsed tubing is preheated prior to the seam-forming operation. This can be accomplished, for example, by disposing heat-sealing units adjacent to the collapsing squeeze rolls, whereby the heat retained in the plastic from the extrusion process is utilized in the seam formation. Also, by shortening the travel of the collapsed tubing before sealing, the exposure to possible dirt contamination which impairs the effectiveness of the seal is reduced. Separate means for heating the tubing may be disposed adjacent the heat-sealing means to insure proper ribbon temperature prior to sealing thereof.

The nature of the invention and the manner in which it may be practiced will become clear from the following detailed description, when taken in conjunction with the accompanying drawings forming a part of this specification, and wherein FIGURE 1 is a schematic representation of the apparatus to be employed in the process of forming multiple tubing;

FIG. 2 is an enlarged fragmentary view of the seaming means and appurtenant parts represented in the upper portion of FIG. 1;

FIG. 3 is an enlarged fragmentary view of the lower portion of the apparatus illustrated in FIG. 2;

FIG. 4 is a fragmentary vertical sectional view taken through the heat-sealing station of the apparatus illustrated in FIG. 1;

FIG. 5 is a sectional view taken on line 5—5 of FIG. 4;

FIG. 6 is a right rear elevational view of the apparatus illustrated in FIG. 4;

FIG. 7 is a perspective view of a back-up pad utilized in this invention;

FIG. 8 is an end elevational view of the slitting means employed in this invention;

FIG. 9 is an enlarged elevational view taken on line 9—9 of FIG. 1;

FIG. 10 is a sectional view taken on line 10—10 of FIG. 9;

FIG. 11 is a sectional view taken on line 11—11 of FIG. 9;

FIG. 12 is a sectional view taken on line 12—12 of FIG. 9;

FIG. 13 is an enlarged transverse sectional view of a tubing member formed in accordance with the principles of this invention;

FIG. 14 is a front perspective view of a sealing unit and mount employed in this invention; and FIG. 15 is a rear perspective view of the members illustrated in FIG. 14.

Referring now to the drawings wherein like reference numerals designate like parts, the reference numeral 2 designates a support for an extruder 4 which is adapted to melt a thermoplastic composition and force it through a die 6 having an annular orifice so as to form a seamless tubing 8. Means, not shown, are provided to supply an inflating medium, such as air, to the interior of the tubing 8.

A pair of squeeze rolls 10 and 12 serve to retain the inflating medium within the tubing 8 and also withdraw the tubing from the orifice in a substantially vertical direction, as the tubing is concomitantly collapsed into the form of a flattened ribbon. Squeeze roll 10 is rotatably mounted on shaft 14, and squeeze roll 12 is rotatably mounted on shaft 16. The shafts 14 and 16 are, in turn, journalled in bearings 18 and 20, respectively, which are supported by a framework 22. Either or both rolls 10 and 12 are driven by conventional means, not shown, to rotate at the same peripheral speed. A two-ply ribbon 24, which results from the collapsing action of the squeeze rolls 10 and 12 then engages a guide roll 26. The ribbon 24 then passes into and through a sealing station 28, see FIG. 1, wherein a plurality of heat seals or welded seams are formed between the two plies of the collapsed ribbon 24.

The sealing station 28 is preferably disposed as closely as is feasible to the squeeze rolls 10 and 12. As a result of such a disposition, the heat remaining in the ribbon 24 from the extrusion process is utilized in the course of the heat sealing or seam formation between the two plies of the ribbon. It is further evident that, by shortening the ribbon travel from the squeeze rolls to the sealing station, the possibility of dirt contamination is reduced to a minimum. Additional heat may be imparted to the collapsed ribbon 24 by means of a heating means, not shown, which may be disposed between the squeeze rolls 10 and 12 and the guide roll 26 and, also, by heating the guide roll directly.

The sealing station 28 an end view of which is illustrated in FIG. 3 comprises a plurality of horizontally aligned recessed back-up pads 30, one of which is illustrated in FIG. 7, over which the ribbon 24 slidably moves, plus a plurality of cooperating heat-sealing units 32 (see FIG. 14), oppositely disposed to said pads. The ribbon 24 moves between the units 32 and the pads 30 during the sealing process.

As will be more clearly seen from FIGS. 3, 4 and 7, the upper edge of each back-up pad is rounded at 34 to obviate tearing or catching of the moving ribbon 24. The pads 30 are preferably composed of Micarta, but may also be composed of wood, steel, Bakelite or other rigid, smooth-surfaced material. The smooth surface of each back-up pad over which the ribbon 24 slidably moves assists in removing any wrinkles which may be present therein.

As is more clearly seen from FIG. 4, each back-up pad has a recess 36 in the face thereof which has the longitudinal end limits thereof defined by the pad flat surface portions 33 and 35. The moving ribbon 24 slidably engages these portions in the normal course of operation. Each heat-sealing unit 32 which is oppositely disposed to a back-up pad has two projecting runner portions 38 of arcuate configuration formed integrally therewith and oppositely disposed to the pad recess 36. Each unit 32 is preferably composed of a heat-conducting material which is also noncorrodible, such as brass, stainless steel or aluminum. A heating element such as cartridge heater 40 is inserted in a longitudinal aperture 42 of each unit and is secured therein by means of a set screw 44, as illustrated in FIG. 14, or other equivalent means. The heater 40 is wired in series with a rheostat, not shown, whereby the temperature of the heating unit runner portions 38 may be regulated. The moving ribbon 24 slidably engages the runners 38 of each unit 32 and the two plies of the ribbon are welded together forming a seam comprising two spaced heat seals disposed parallel to the longitudinal center axis of the ribbon. The pads 30 thus also function as supporting surfaces which maintain the thermoplastic film in position and permit the heat-sealing units to function.

It will be noted from FIG. 4 that recess 36 of each back-up pad is formed with a predetermined radius of curvature similar to the radius of curvature of the edges of the sealing unit runners 38. It will, in addition, be noted from FIG. 5 that the pad recess 36 is concave in horizontal section and of sufficient dimensions to allow the oppositely disposed runners 38 to be received therein.

The seal between the two plies of the ribbon 24 is affected not only by the speed of the ribbon movement and the temperatures of the ribbon and sealing unit, but also by the arc of contact between the arcuate edges of the runners 38 of each sealing unit and the moving ribbon. This arc of contact may be finely regulated by adjusting the distance the runners 38 project into the recess 36 of each back-up pad 30. It is apparent from FIG. 4 that, as the runners 38 assume fixed positions which approach the surface of recess 36, a greater area of ribbon will be contacted and, thus, more heat per unit time will be imparted to the moving ribbon 24. The regulatable arc of contact provided by the illustrated apparatus thus affords an efficient means for controlling the nature of the tubing seams.

In the normal position of assembly, both the pad recesses 30 and the sealing unit runners 38 will be disposed parallel to the longitudinal center axis of the moving ribbon 24, whereby a plurality of parallel seams will be formed therein. The means maintaining the back-up pads 30 and the sealing units 32 in desired alignment relative to the moving ribbon 24 comprise the back-up pad slotted support channel 46 and the sealing unit slotted support channel 48 (see FIGS. 4 and 5). It will be noted from FIGS. 2 and 3 that the support channel 46 is fixedly secured to a portion of frame 50 and is transversely disposed to the moving ribbon 24. Each back-up pad has two dowel pins 52 projecting from the rear surface thereof for purposes of being slidably engageable within slot 54 formed in the channel 46, see FIG. 5, and, thus, becoming properly aligned on the channel relative to the ribbon. Securing bolts 56, illustrated in FIGS. 4 and 5, which traverse the channel 46 threadedly engage tapped apertures 58 disposed in each of said back-up pads and in cooperation with coil springs 60 interposed between the head of each bolt 56 and the rear surface of the support channel 46 effect a force tending to affix the back-up pads securely to the face of the support channel 46. To dispose a back-up pad at any desired position on channel 46, all that need be done is insert dowel pins 52 in the channel slot 54, insert the securing bolt 56 in the pad aperture 58, and tighten. Also, to dispose the back-up pad in a new position on the channel, the pad is simply slidably moved into the new desired position.

Each heat-sealing unit 32 is assembled to a mount 62, see FIGS. 14 and 15, which is preferably composed of a heat resistant material such as Transite preliminarily to being supported by the sealing unit support channel 48. As is illustrated in FIG. 4, each sealing unit mount 62 has two vertically aligned countersunk apertures 64 for enabling bolt member 66 to traverse the same and engage tapped apertures 68 in each of said sealing units and thereby secure the two together. Each sealing unit mount has two dowel pins 70 projecting from the rear surface thereof. The pins slidably engage slot 72 of support channel 48, as illustrated in FIG. 6, and maintain the sealing units in proper horizontal alignment on the channel and transversely to the moving ribbon. Each sealing unit mount is tapped at 74, as illustrated in FIGS. 4 and 5, for purposes of engaging securing bolts 76 which traverse each of the support channels 48 and which, in combination with coil springs 78, disposed between the rear surface of the channel 48 and the undersurfaces of the heads of the bolts 76 secure the sealing units and mounts to the front surface of the support channel 48. The heating units are obviously readily adjustable on their supporting channel and fixedly positioned thereon by means of the pins 70 and bolt members 76.

Although support channel 46 for the back-up pads is fixedly positioned, the oppositely disposed support channel is movable relative thereto to enable a predetermined arc of contact to be effected between the sealing unit runners 38 and the moving ribbon 24. The channel 48 is secured to a frame portion 80 of the illustrated apparatus (see FIGS. 2 and 3) which is pivotally movable about shaft 82 journalled in bearings 84, which engage opposed ends of shaft 82; one of the bearings 84 is shown in FIG. 2. A coil spring 86 secured at one end limit at 88 to frame portion 50 and secured at the opposed end limit to hook 90 affixed to frame portion 80 effects a tension tending to bring the two opposed channels together.

To position the two opposed channels in desired spaced relationship, adjusting screws 92 which threadedly engage boss portions 94 disposed at either end portion of channel 48 and which abut against channel 46 at their distal end limits are utilized. By turning the adjusting screws 92, in appropriate directions, the distance between the opposed channels 46 and 48, and the heat-sealing runner-ribbon arc of contact dependent thereon, may be finely regulated.

If an integral flattened tubing 24 having no heat-sealed seam therein is the desired product, spring member 86 is disengaged from hook 90 secured to frame portion 80 and the frame portion is pivoted upward and locked in place; the ribbon 24 is then wound on a reel member. The panel 96, more clearly seen in FIG. 9, and attached to framework portion 80 is adapted to support volt meters and sealing unit rheostats, none of which is shown.

Upon emerging from the heat-sealing station 28, the ribbon 24 possesses a transverse sectional configuration illustrated in FIG. 11. It will be noted from this latter figure that the original two-ply film sheeting of FIG. 10 now possesses a plurality of longitudinally extending pockets defined by seams comprising double seals 98 spaced apart by an unsealed ribbon portion 100, as illustrated in FIG. 11. If the pocketed tubing product having the longitudinal seals 98 disposed therein is the desired end product, it will then be wound on a collecting reel. This product will comprise an integral tubing member having a plurality of pocket-defining, spaced seams running the length of the tubing member, which seams are disposed parallel to the tubing longitudinal central axis.

However, if the desired end product to be obtained from the illustrated apparatus is a plurality of discrete tubing members of desired flat widths, the ribbon of FIG. 11 proceeds to engage blade members 102 secured to blade holders 104 which are, in turn, secured to a rotatable shaft 106, as illustrated in FIG. 8. The blade members are disposed in the path of the moving ribbon so as to slit the unsealed seam portion 100 disposed between the seals 98 of each seam. When the blade members 102 are not to be utilized, shaft 106 is rotated by means of a handle 108 until blades 102 are out of the path of the ribbon 24 (see FIG. 1) and locked in place. The ribbon 24 will engage the blade members 102 after first engaging a guide roll 110, as illustrated in FIGS. 1 and 8. The blade holders 104 may comprise split collars or other equivalent slidably movable and fixedly positionable means for aligning the blades 102 on the shaft 106. The blades 102 are disposed relative to the heat-sealing assemblies so that each of the blades 102 is in vertical alignment with the midpoint between the two runners 38 of a superposed heat-sealing unit 32. It is apparent from FIG. 9 that, by being so disposed, each blade 102 will slit the midpoint of the unsealed portion 100, see FIG. 11, of the moving ribbon 24. By slitting the tubing unsealed portions, the tubing resistance to the blade edges is maintained at a minimum and greater accuracy results in the slitting operation. As a result of the latter slitting operation, the plurality of discrete tubing members 112 illustrated in FIG. 12 will result. Each of the tubings 112, as will be noted from FIG. 13, will have two heat-sealed lateral end portions 98 which are directly opposed to each other plus opposed end limits 114 comprising the unsealed portions between opposed plies of the horizontal ribbon 24, each of which corresponds to half a previous unsealed portion 100 of the integral tubing of FIG. 11.

Referring to FIG. 12, it will be noted that the end portions 116 may be insufficient in size in many instances to be incorporated in a desired tubing member, whereupon they will be sent to waste collectors 118, as illustrated in FIG. 1. The end portions should obviously be maintained as narrow as possible to maintain waste at a minimum. However, an original fold or both folds of the flattened ribbon 24 may be utilized in a final tubing product 112 if proper seam disposition is arranged.

After the centers of the unsealed portions 100 of the ribbon 24 have been slit so as to form the discrete tubing members 112 illustrated in FIG. 12, the tubing members engage guide roll 119 and then guide rolls 120 and 122, as illustrated in FIG. 1. After engaging the latter guide roll members, alternate tubing members engage guide rolls 124 and 126 prior to being collected on the take-up reels 128 and 130, respectively. The take-up reels are torque compensated to obviate increased peripheral speed as the reel diameter increases.

The facility with which multiple tubings of predetermined flat widths may be formed is apparent from the above-described process. The desired flat width tubing may be readily formed merely by disposing the movable back-up pads and heat-sealing units at proper intervals across their respective support channels. The proper alignment of the blade members 102 secured to blade holders 104 which are movable on shaft 106 is quickly effected by properly disposing the blade holders 104 on the shaft in alignment with the midpoint of the seams formed in the sealing station. It is obvious that tubings of identical or varying flat width may be simultaneously formed depending upon the spacing of the sealing and slitting elements.

Each of the final tubing members has a strong, rugged seal or weld between the opposed plies for opposed side seams which define the lateral end limits thereof. The tubing members which are concomitantly formed may be of any desired width depending upon the interval between the heat-sealing units and the opposed back-up pads and slitting members which are in alignment therewith. The directions of extrusion and ribbon movement need not be in the directions shown, but may be adjusted to suit the manufacturing accommodations.

Though the initial starting material for purposes of this invention is preferably the extruded tubing 8 above described, two overlying coextensive thermoplastic sheets may also be utilized as the original starting material. If an integral tubing member having a plurality of longitudinal pockets therein is the desired end product, the shaft 106 and attached slitting members 102 may be readily rotated out of the path of the ribbon 24 by means of a handle 108, illustrated in FIG. 1, or other equivalent means and locked in place by means not shown, as has been previously mentioned.

If an integral tubing member having a plurality of longitudinal pockets is the desired end product, heat-sealing units having a single sealing runner of arcuate configuration may be utilized instead of the illustrated heat-sealing units having the twin projecting runner members 38.

The above-described tubing formation process is flexible and is not limited to use with the initially described extrusion process and apparatus. This provided process may be used in conjunction with other teachings pertaining to the formation of thermoplastic tubing, such as Patents No. 2,461,975, No. 2,461,976, and No. 2,632,206.

Though the invention is particularly suitable for use with flattened tubing of polyethylene, it is not restricted thereto. In general, the invention can be utilized with any melt extrudable thermoplastic material, mixtures thereof, and mixtures of synthetic rubbers with thermoplastic materials. Each thermoplastic substance or composition possesses certain properties which may make it necessary to determine by experiment the variables in the process which have to be balanced in order to produce tubing of the desired characteristics.

For instance, with a polyethylene film having a thickness of 1.5 mils, satisfactory results are obtained under the following conditions: The temperature of the sealing shoe may be approximately 235° to 250° F. Also, the temperature of squeeze rolls utilized with such a film should not be in excess of approximately 130° F. The temperature of the collapsed tubing, or ribbon 24, preliminarily to entering the heat-sealing station, may be between approximately 100° to 140° F. and preferably 120° F. Obviously these temperatures will vary with the type and thickness of the film used.

It has been found that heat-sealing units 32 in which the runners 38 have an edge thickness of 1/16 inch and have an interval therebetween of 1/8 inch will work to advantage in the sealing of polyethylene film. Using such a unit, it is apparent that the unsealed end portions 114 of the tubing illustrated in FIG. 13 will be 1/16 inch and the sealed portions 98 will also be 1/16 inch. These dimensions are, of course, given by way of illustration and other dimensions will, similarly, work to advantage.

It is intended that the speed of film utilized in this process be any speed up to about 100 feet per minute. The film in the course of its travel through the illustrated apparatus will always be under a slight tension, whereby the film may be kept taut. However, the film should not be kept so taut so as to effect appreciable stretching. Hereinafter is set forth a list of illustrative thermoplastic materials which can be used in this invention in addition to polyethylene:

Cellulose acetate
Cellulose acetate butyrate
Ethyl cellulose
Methyl methacrylate polymer
Nylon (extrusion or molding grade)
Polystyrene
Polyvinyl formal-acetate butyral
Copolymers of vinyl chloride and vinyl acetate (Vinylite)
Polyvinyl chloride (Geon)
Copolymers of vinyl chloride and vinylidene chloride (Saran)

The properties of the thermoplastic substance or composition can be modified, as by the incorporation therein of suitable modifying agents, such as plasticizers, fillers, coloring agents, heat stabilizers, anti-oxidants, etc.

Also, the edge portions of the runners of said heat-sealing unit may be coated with a material adapted to reduce the coefficient of friction between the runners and the slidably engaged thermoplastic plies.

Since it is obvious that various changes and modifications may be made in the above description without departing from the nature or spirit thereof, this invention is not restricted thereto except as set forth in the appended claims.

What is claimed is:

1. In combination for sealing together two moving coextensive plies of thermoplastic material, a plurality of adjustable heat-sealing means, first aligning means for maintaining said adjustable heat-sealing means in horizontal alignment transversely to the longitudinal axis of the moving plies; smooth-surfaced back-up pads, having recessed faces over which the coextensive plies slidably move, maintained in horizontal alignment and disposed transversely to the longitudinal axis of said plies; adjusting means for regulating the distance between said back-up pads and said heat-sealing means, and adjustable slitting means for engaging said plies and spaced from said heat-sealing means in the path of the moving plies disposed in alignment with each of said heat-sealing means, and second aligning means for maintaining said movable slitting means in horizontal alignment transversely to the moving plies.

2. The combination as recited in claim 1 in which each of said heat-sealing means comprises an apertured member formed of heat conductive material, a heating element housed in said member aperture, and projecting runner portions formed integrally with one surface of said member, one of said thermoplastic sheets slidably engaging said runner portions, each of said runner portions having arcuate, spaced edges, said arcuate edges having a common radius of curvature.

3. In a combination for sealing together two moving coextensive plies of thermoplastic material, a plurality of adjustable heat-sealing means, first aligning means for maintaining said adjustable heat-sealing means in horizontal alignment transversely to the longitudinal axis of the moving plies, each of said heat-sealing means having two projecting runners, said runners having edges of arcuate configuration, said plies slidably engaging said runners in the normal sealing operation, said runners being disposed parallel to the longitudinal axis of said moving plies; smooth-surfaced back-up pads, having recessed faces over which the coextensive plies slidably move, maintained in horizontal alignment and disposed transversely to the longitudinal axis of said plies; the recesses in the faces of said back-up pads being of sufficient dimensions to receive said sealing means runners, said projecting runners of each of said heat-sealing means being oppositely disposed to a back-up pad recess, adjusting means for enabling the arcuate edges of said projecting runners to assume various fixed positions in said back-up pad recesses, and adjustable slitting means for engaging said plies and spaced from said heat-sealing means in the path of the moving plies disposed in axial alignment with the interval between the projecting runner portions of said heat-sealing means, and second aligning means for maintaining said movable slitting means in horizontal alignment transversely to the moving plies.

4. The combination of claim 3 in combination with means for moving said adjustable heat-sealing means and said adjustable slitting means out of the path of the moving thermoplastic plies.

5. The combination as recited in claim 3 in combination with means for extruding a molten thermoplastic into the form of a seamless tubing and means for removing said tubing from said extruding means.

6. In a combination for sealing a plurality of thermoplastic plies together, apertured sealing means, means for heating said sealing means disposed in said sealing means aperture, two parallel projecting runner portions formed integrally with one surface of said sealing means; a back-up pad oppositely disposed to said sealing means in the normal position of assembly, said back-up pad having a recessed portion, said sealing means runner portions being oppositely disposed to said pad recessed portion in the normal assembled position, and means for concomitantly supporting said sealing means and locating the same relative to the surfaces of said back-up pads.

7. A heat-sealing device for sealing together a plurality of moving superposed thermoplastic plies comprising a heat-sealing unit, means disposed within said heat-sealing unit for heating said latter unit, and projecting, fixed runner portions formed integrally with one surface of said unit, said runner portions having arcuate spaced edges for slidably engaging one of such moving thermoplastic plies, said edges having a common radius of curvature, means for supporting portions of said moving thermoplastic plies which straddle that portion of said thermoplastic plies engaging said runner portions arcuate spaced edges, said thermoplastic ply portions engaging said arcuate spaced edges being unsupported in the course of having heat-seals formed therein.

8. The combination as recited in claim 7 in which the edge portions of said runners are coated with a material adapted to reduce the coefficient of friction between said runners and said thermoplastic plies.

9. In a combination for sealing a plurality of thermoplastic sheets together, heat-sealing means, parallel projecting runner portions disposed on one surface of said sealing means, and a back-up pad oppositely disposed to said heat-sealing means in the normal operative position, said back-up pad having a depression which is concave in transverse section disposed normal to one surface thereof which is opposite to said runner members in the normal operative position, one of such thermoplastic sheets to be joined together slidably engaging said projecting runner portions and being urged into said depression in spaced relation with the depression-defining surface of said back-up pad in the normal course of sealing operation.

10. The combination as recited in claim 9 in which said back-up pad depression is of sufficient dimensions to receive said heat-sealing means runner portions therein.

11. In a combination for fusing a plurality of moving thermoplastic sheets together, adjustable heat-sealing means, parallel projecting runner portions formed integrally with one surface of said sealing means, a fixedly positioned back-up pad oppositely disposed to said heat-sealing means in the normal operative position, said back-up pad having an arcuate depression which is concave in cross section and disposed normally to one surface thereof which is opposite to said runner portions in the normal operative position, said projecting runner portions having curvilinear edges for being engaged by the surface of one of such moving thermoplastic sheets to be joined together, spring means for effecting a tension tending to bring said sealing means into engagement with said back-up pad, and adjustable separator means for regulating the distance between said heat-sealing means and said back-up pad.

12. In a combination for sealing together two moving coextensive plies of thermoplastic material, a plurality of adjustable heat-sealing means, first aligning means for maintaining said adjustable heat-sealing means in horizontal alignment transversely to the longitudinal axis of the moving plies, each of said heat-sealing means having two projecting runners each of said runners having an edge of arcuate configuration, said moving plies slidably engaging the arcuate edges of said runners in the normal course of the sealing operation, said runners being disposed parallel to the longitudinal axis of said moving plies; smooth-surfaced back-up pads, having recessed faces over which the coextensive plies slidably move, maintained in horizontal alignment and disposed transversely to the longitudinal axis of said plies; the recesses of said pads being of sufficient dimensions to receive said sealing means runners, said projecting runner portions of each of said heat-sealing means being oppositely disposed to a back-up pad recess, and adjusting means for enabling the arcuate edges of said projecting runners to assume various fixed positions in said back-up pad recesses.

13. In a combination for sealing two moving coextensive plies of material together, first means for slidably engaging said coextensive plies in the course of their movement thereover, said first means having smooth-surfaced planar portions for slidably engaging said plies maintained in spaced relation by means of a recess formed in said first means, second means opposed to said first means having projecting runners of arcuate configuration, said arcuate runners being disposable in said first means recess parallel to the direction of movement of said coextensive plies whereby said plies may concomitantly slidably engage said planar portions of said first means and said arcuate portions of said second means.

14. The combination as recited in claim 13 in which a heating element is disposed in said second means for heating the arcuate runners thereof.

References Cited in the file of this patent

UNITED STATES PATENTS

| | | |
|---|---|---|
| 2,114,625 | Bergstein | Apr. 19, 1938 |
| 2,169,936 | Wagner | Aug. 15, 1939 |
| 2,200,971 | Sonneborn et al. | May 14, 1940 |
| 2,347,439 | Shea et al. | Apr. 25, 1944 |
| 2,444,685 | Waters | July 6, 1948 |
| 2,461,975 | Fuller | Feb. 15, 1949 |
| 2,461,976 | Schenk | Feb. 15, 1949 |
| 2,466,387 | Curtis | Apr. 5, 1949 |
| 2,529,732 | Howard | Nov. 14, 1950 |
| 2,544,044 | Reber et al. | Mar. 6, 1951 |
| 2,547,779 | Renyck | Apr. 3, 1951 |
| 2,614,953 | Anglada | Oct. 21, 1952 |
| 2,670,783 | Moravec et al. | Mar. 2, 1954 |
| 2,740,740 | Binnall | Apr. 3, 1956 |
| 2,741,956 | Diffenbaugh | Apr. 17, 1956 |
| 2,742,080 | Cloud | Apr. 17, 1956 |
| 2,759,524 | Davis | Aug. 21, 1956 |
| 2,805,973 | Klasing et al. | Sept. 10, 1957 |